United States Patent [19]

Chapman et al.

[11] 4,434,936

[45] Mar. 6, 1984

[54] IRRIGATION SYSTEM

[75] Inventors: John A. Chapman, Wahoo, Nebr.; Owen W. Sherwin, Fort Wayne, Ind.

[73] Assignee: Valmont Industries, Inc., Valley, Nebr.

[21] Appl. No.: 304,577

[22] Filed: Sep. 22, 1981

[51] Int. Cl.³ .............................................. B05B 3/18
[52] U.S. Cl. ..................................... 239/178; 239/710; 239/720; 239/721; 285/5
[58] Field of Search ............... 239/177, 178, 183, 184, 239/710, 711, 718–721; 285/5

[56] References Cited

U.S. PATENT DOCUMENTS

| | | | |
|---|---|---|---|
| 3,394,729 | 7/1968 | Bower et al. | 239/710 |
| 3,690,343 | 9/1972 | Crane | 239/720 |
| 3,707,164 | 12/1972 | Clemons | 239/711 |
| 3,802,627 | 4/1974 | Seckler et al. | 239/177 |
| 3,902,668 | 9/1975 | Daugherty et al. | 239/177 |
| 4,034,778 | 7/1977 | Sage et al. | 239/710 |
| 4,041,975 | 8/1977 | Ames | 239/720 |
| 4,085,771 | 4/1978 | Hunter | 239/720 |
| 4,172,551 | 10/1979 | Johnson | 239/711 |

FOREIGN PATENT DOCUMENTS 2750355  5/1979  Fed. Rep. of Germany ...... 239/177

Primary Examiner—John J. Love
Assistant Examiner—Michael J. Forman
Attorney, Agent, or Firm—Rogers, Eilers & Howell

[57] ABSTRACT

An irrigation system, such as of the self-propelled type with a series of self-propelled support towers for supporting and moving an irrigation conduit over a field to be irrigated, the conduit comprised of a series of conduit sections supported by the towers. The system is for use on sloping or uneven terrain causing tension or compression loads in the system, and includes a control for sensing such a load and for controlling the movement of selective support towers to relieve the load. Included is a coupling for joining adjacent conduit sections which senses the relative displacement of said sections caused by said load. Also included is a steerable support tower which is steered in response to the coupler sensing said displacement to relieve said load.

20 Claims, 16 Drawing Figures

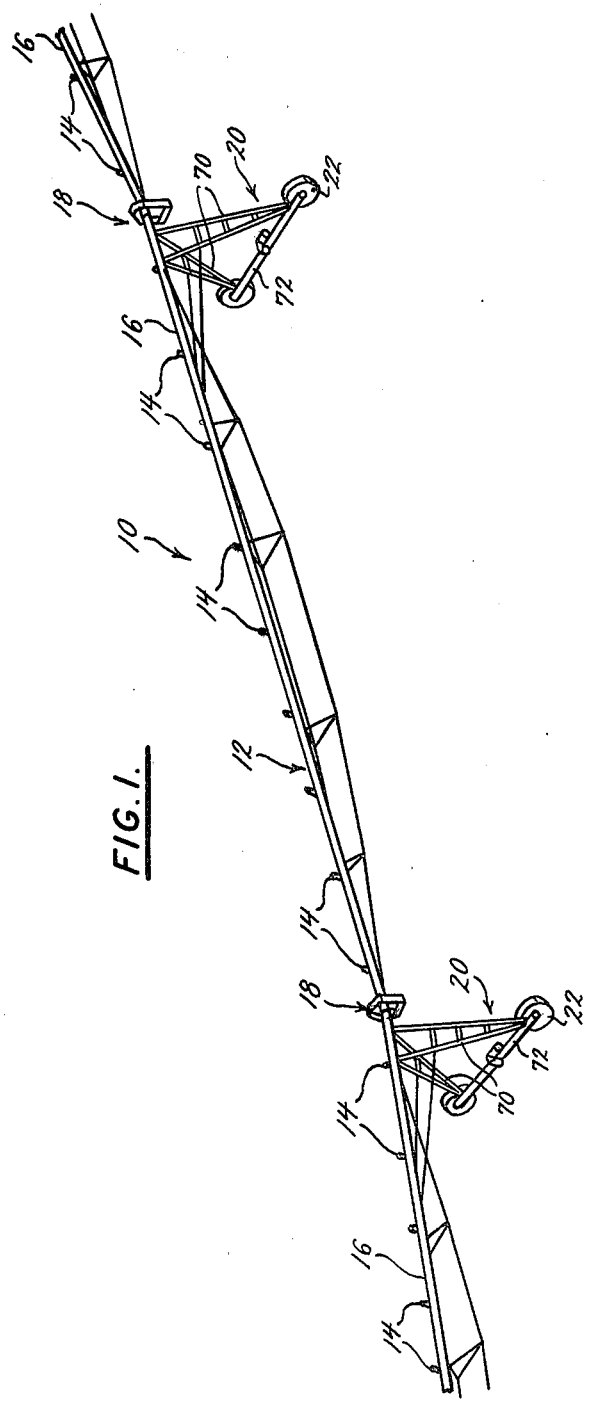

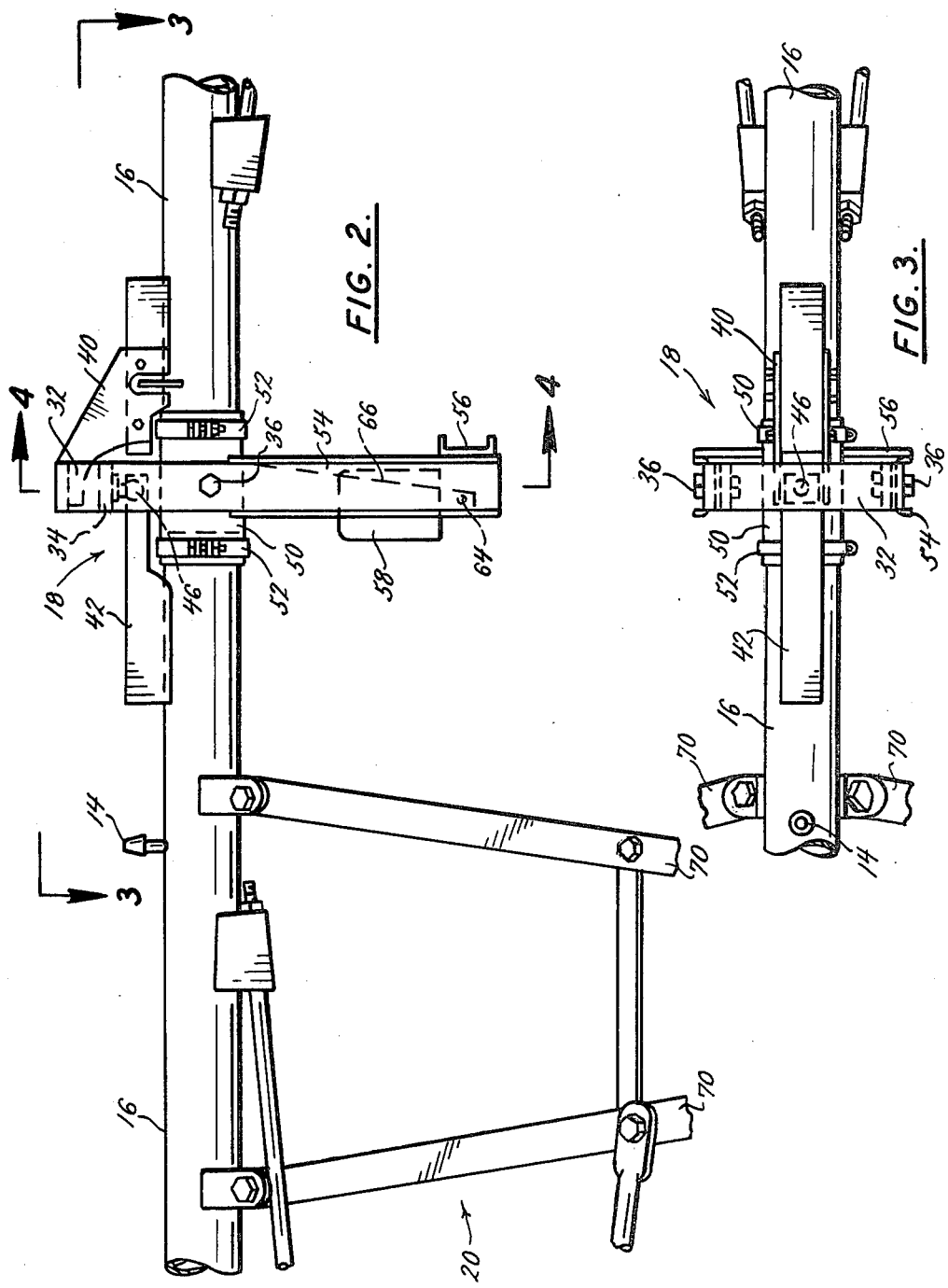

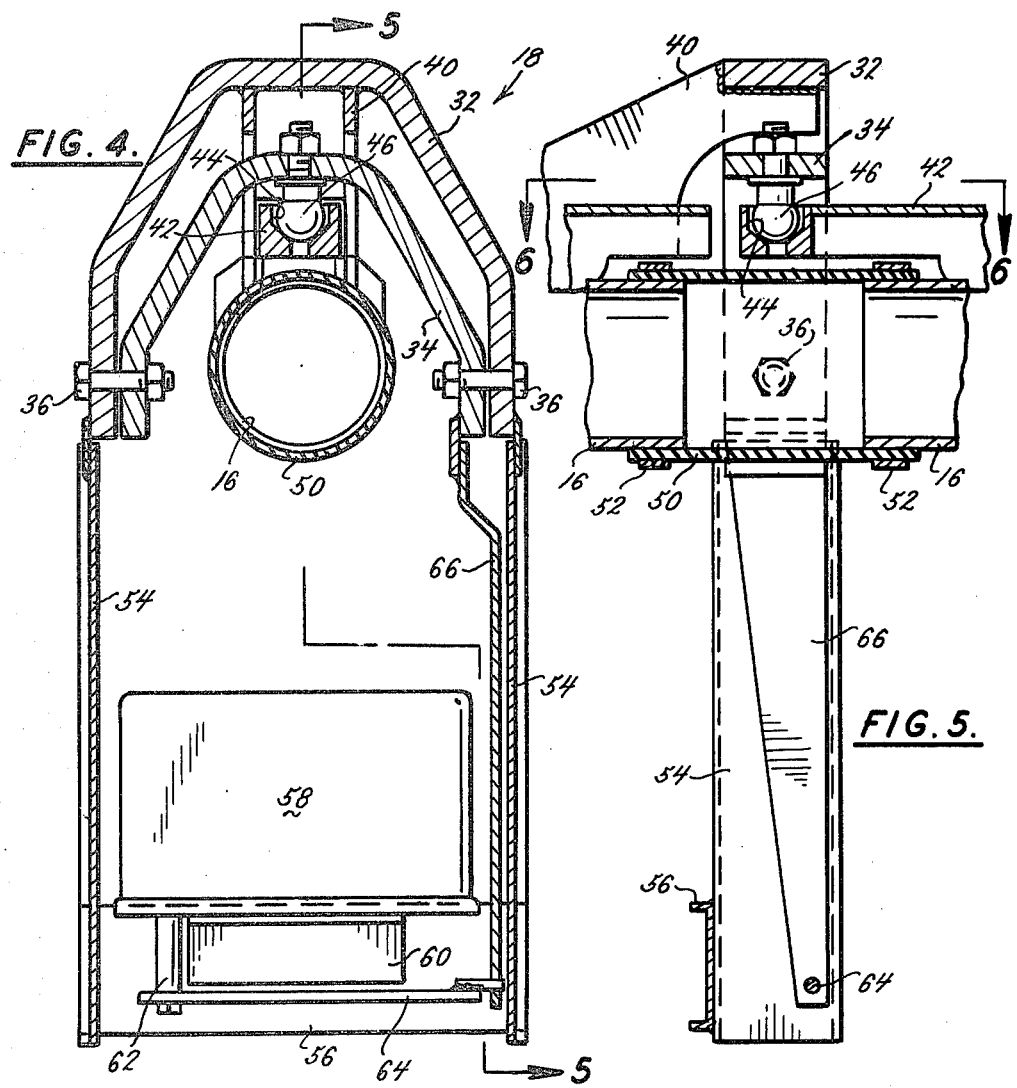
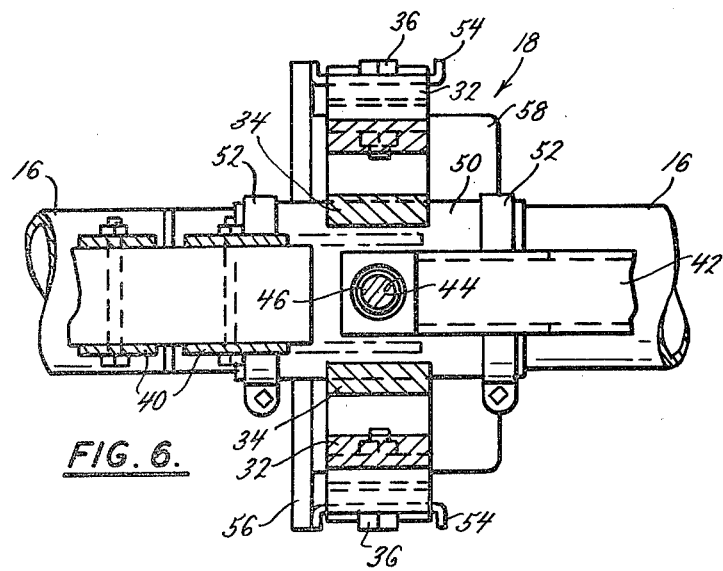

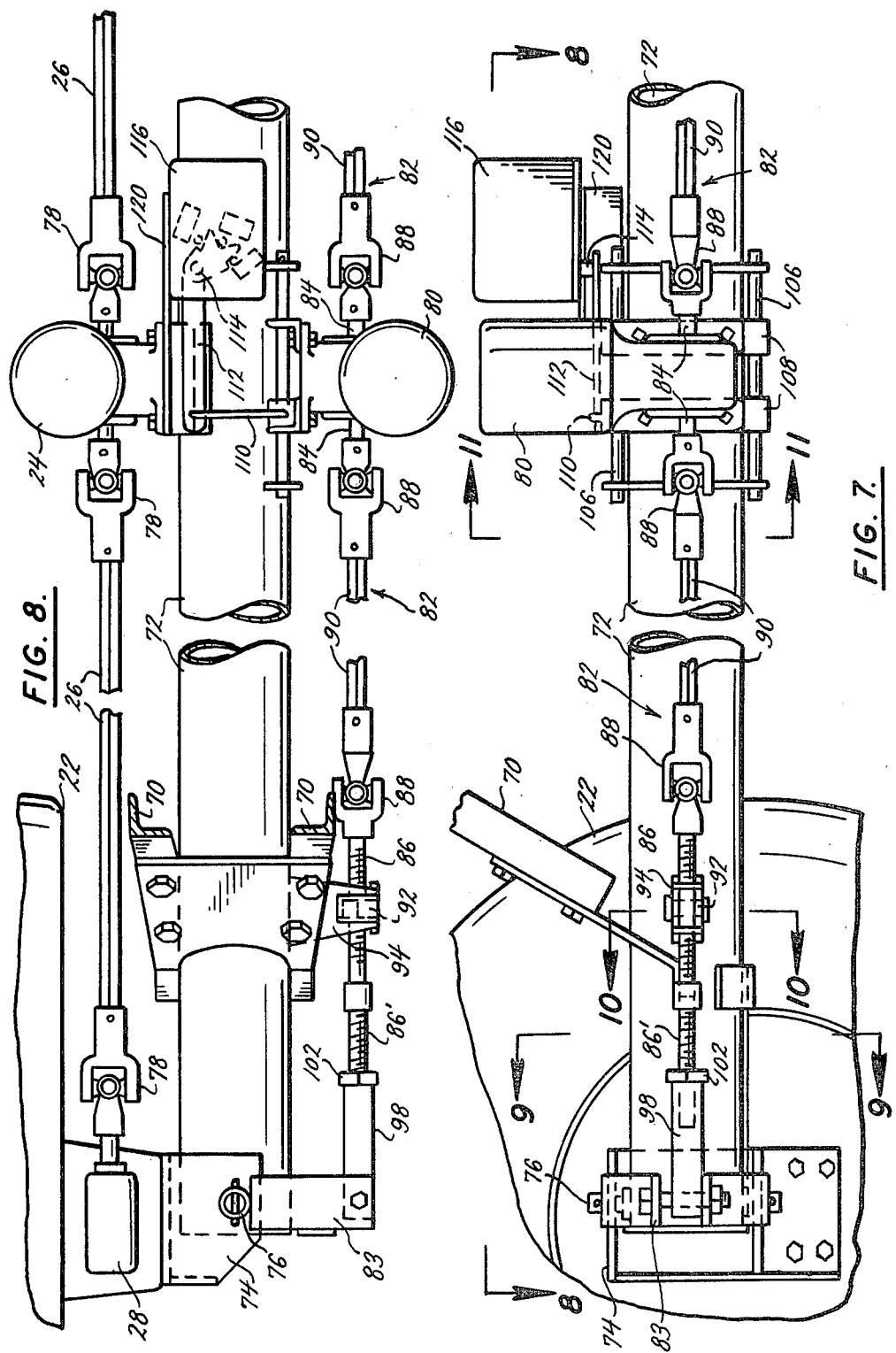

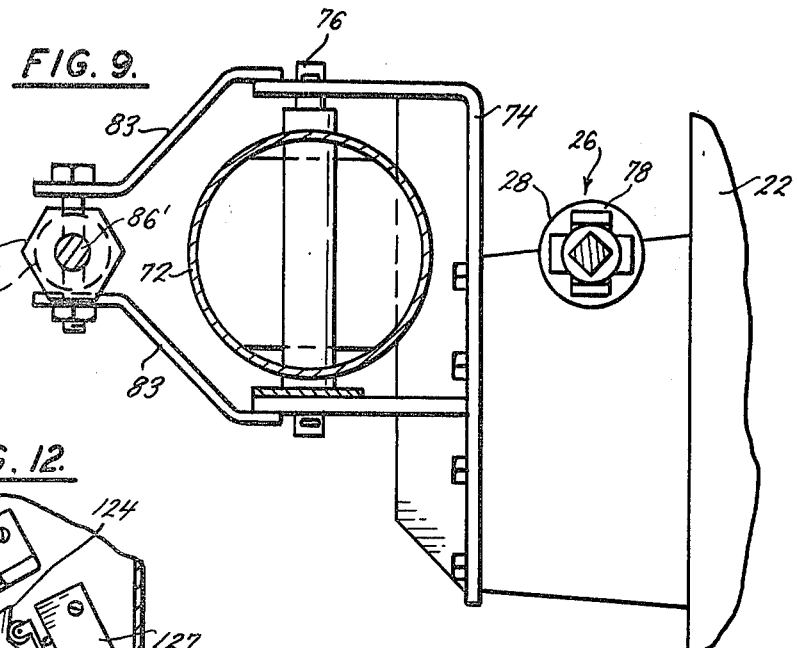
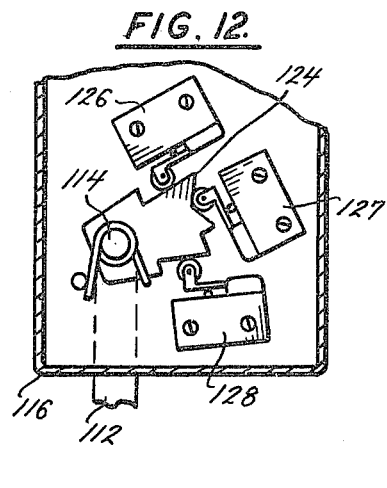
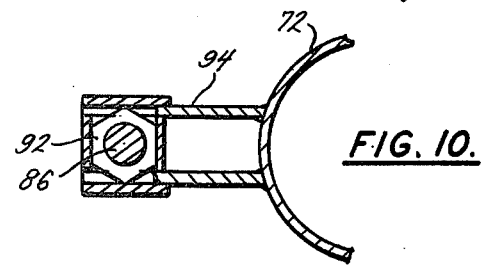
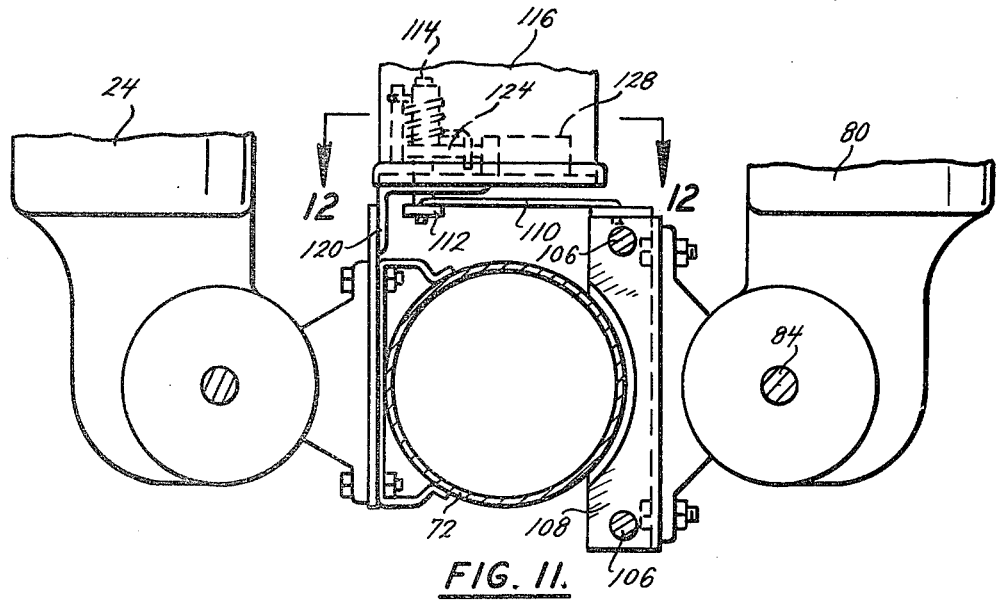

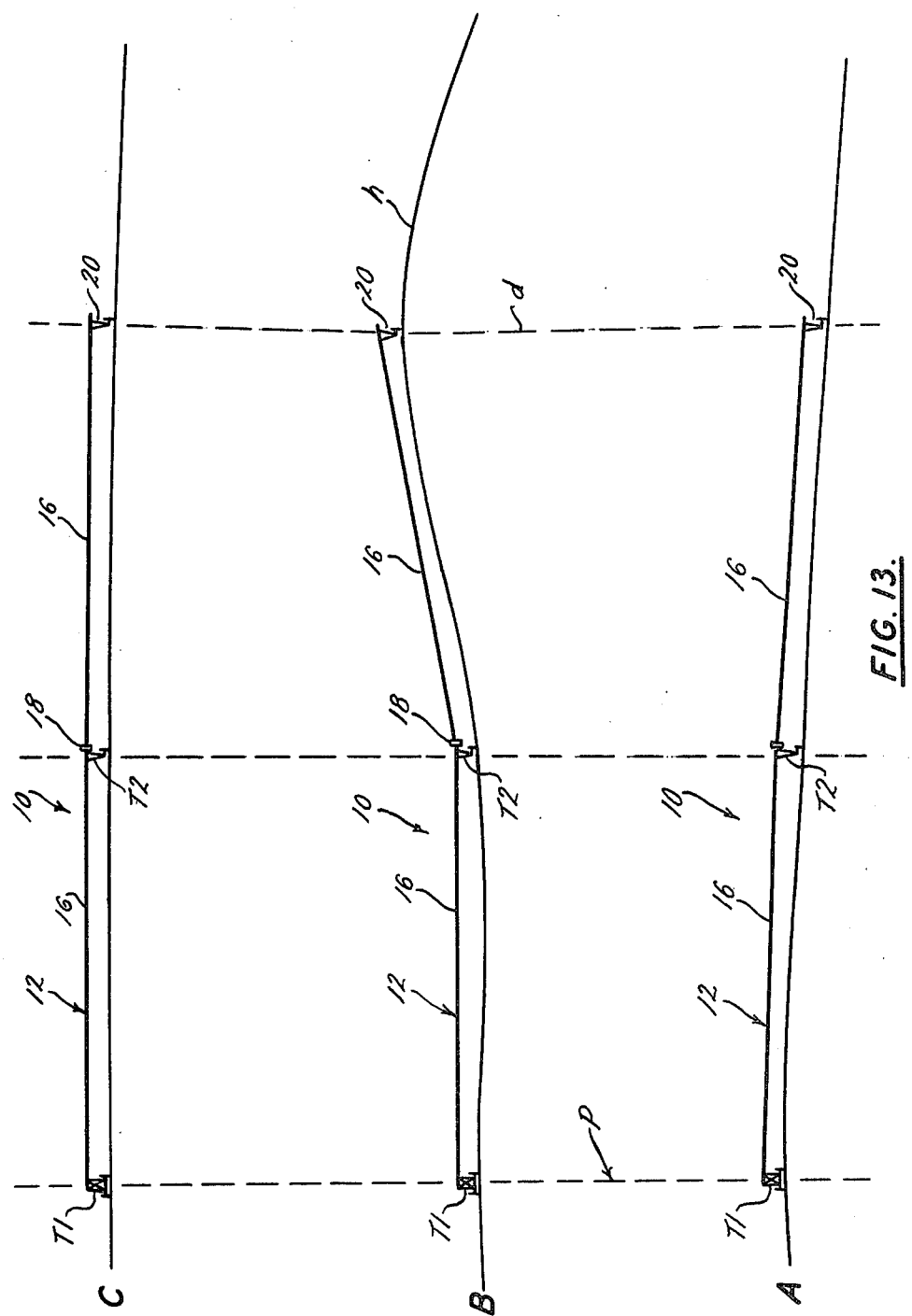

IRRIGATION SYSTEM

BACKGROUND AND SUMMARY OF THE INVENTION

This invention relates to an irrigation system for use on sloping or uneven terrain, and particularly such a system of the linear or center-pivot type. If of the center-pivot type, one end of the system is pivotally mounted at a central location in the field for rotation of the system about a generally vertical axis at the pivot location. A center-pivot system may irrigate a generally circular area, or a nearly square area with the recent development of the center-pivot corner system as shown and described in U.S. Pat. Nos. 3,802,627 and 3,902,668, the entirety of which are incorporated herein by reference. If of the linear type, neither end is pivotally mounted, but instead both ends move down the field to be irrigated, although the path followed by the system may be either straight or curved.

The center-pivot and linear systems are similar in many respects, both having a relatively large conduit extending over portions of the land or field to be irrigated and which is supported at intervals, such as by self-propelled support towers. The term "self-propelled" in the irrigation art typically refers to a tower having wheels which are driven to move the tower, and thus the conduit supported thereon, over the field. The conduit is usually composed of sections, or spans, which are coupled end-to-end with a support tower for each span. Means are provided for maintaining these spans in alignment, i.e., such that the irrigation conduit appears straight when looking down on the system, as the system moves over the field to be irrigated. The present invention includes either type of system for use on sloping or uneven terrain.

The problems of maintaining alignment and control of the system without excessive tension or compression loads in the spans or at the connections between the spans, and so that the system will follow a true and repeatable path over the field, are considerably greater on sloping or uneven terrain than on flat terrain. To illustrate with a center-pivot type system with one end of the system pivotally mounted, if the system extends downhill from the central pivot location, the system will be in tension. If it extends uphill, it will be in compression. Also, as one or more of the support towers along the length of the system moves over uneven terrain so that it moves up and down hills or in and out of draws as it traverses the field, tension and compression loads are created in the system. If the slope or unevenness of the terrain is relatively severe, these loads can be excessive causing control problems and even damage to the system. These problems can be even more severe with a linear system where neither end is pivotally mounted, but instead both ends must move down the field. Controlling and guiding a linear system is inherently more difficult, so that the problems of sloping or uneven terrain become even more acute.

The present invention solves the problems associated with sloping or uneven terrain in providing an irrigation system with means for sensing tension and compression forces in the system caused by sloping or uneven terrain, and with means for controlling the movement of one or more support towers in response to sensing such a load for relieving the load in the system. In a preferred embodiment of the invention, the sensing means includes at least one coupling for connecting adjacent conduit sections of the system, the coupling having a pivotal yoke arrangement to which the ends of the adjacent conduit sections are connected, and wherein the yoke is pivotally displaced in response to such a load. The preferred embodiment also includes one or more support towers having steerable wheels and wherein the wheels of one or more of the towers are steered in response to the pivotal displacement of the yoke to effect a corrective movement of the tower to relieve the load.

The invention will now be described in more detail with reference to the drawings, but first the drawings themselves will be briefly described.

DESCRIPTION OF THE DRAWING

FIG. 1 is an isometric view of a portion of an irrigation system of the present invention showing typical adjacent spans;

FIG. 2 is an enlarged side elevation of the connection joining the adjacent spans at the support tower;

FIG. 3 is a view taken generally along the line 3—3 of FIG. 2;

FIG. 4 is an enlarged view in section taken generally along the line 4—4 of FIG. 2;

FIG. 5 is a view in section taken generally along the line 5—5 of FIG. 4;

FIG. 6 is a view in section taken generally along the line 6—6 of FIG. 5;

FIG. 7 is an enlarged side elevation of the lower portion of the support tower of FIG. 1;

FIG. 8 is a view in section taken generally along the line 8—8 of FIG. 7;

FIG. 9 is an enlarged view in section taken generally along the line 9—9 of FIG. 7;

FIG. 10 is an enlarged view in section taken generally along the line 10—10 of FIG. 7;

FIG. 11 is an enlarged view in section taken generally along the line 11—11 of FIG. 7;

FIG. 12 is a view in section taken generally along the line 12—12 of FIG. 11;

FIG. 13 is a schematic illustrating the operation of the irrigation system of this invention as it moves over uneven terrain.

DETAILED DESCRIPTION OF A PREFERRED EMBODIMENT

Figure 14:
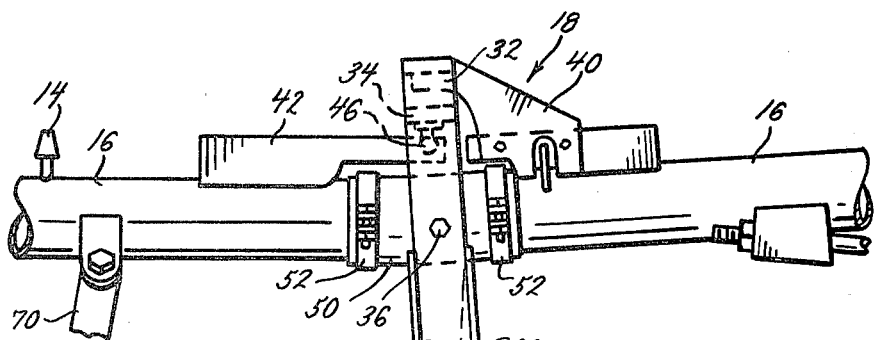
FIGS. 14, 15 and 16 are views similar to FIG. 2, for purposes of explaining the operation of the system.

With reference to the drawing, there is shown an irrigation system 10 of the present invention which may be of either the center-pivot or linear type as previously explained. The system includes an irrigation conduit 12 with liquid dispensers such as sprinklers 14 at spaced locations along the length of the conduit for dispensing liquid such as water onto the field to be irrigated. The irrigation conduit 12 is comprised of conduit sections or spans 16 joined in end-to-end relationship by joints or couplings 18 to be further described. Each span has a support tower 20 at one end thereof for supporting the conduit 12 above the ground and for moving the conduit over the field to be irrigated. In a linear system, there may be a span of the "free standing" type with support towers at both ends thereof.

Preferably, each support tower has wheels 22 which are driven such as by an electric motor 24, linkage 26 and gear drive 28 (FIG. 8) through a suitable control citcuit as is well known in the art for controlling the movement of the tower. Typically each tower has such a drive and each tower's movement is independently controlled. Usually one such tower is made the master tower which is controlled to define the average speed of the system, and the drives of the other towers are controlled to maintain alignment of the conduit sections, all of which is well known in the irrigation art. A suitable alignment control (not shown) is located at each joint between adjacent spans to detect misalignment of the spans and control the drive of the tower at the joint to maintain a straight alignment. The misalignment referred to is that which occurs where one tower moves ahead or lags behind another causing the conduit to appear bent at the joint when looking down on the system. Such misalignment also may be defined as the relative pivotal movement of adjacent conduit sections at the joint therebetween about a generally vertical axis. Alignment controls for correcting such misalignment are well known in the art, and therefore are not shown in the drawing, although it is to be understood that such controls are used at the joints between spans.

In accordance with the invention, one or more of the couplings 18 not only allow relative pivotal movement of adjacent pipe sections about vertical and horizontal axes perpendicular to the conduit, but also sense tension and compression at the joint indicative of tension and compression loads in the spans caused by sloping or uneven terrain. With particular reference to FIGS. 2 through 6, at least one of the joints 18 includes an outer yoke 32 and an inner yoke 34. The yokes are essentially arched members as shown extending over the conduit and are pivotally connected at their lower ends at opposite sides of the conduit by pins or bolts 36. The yokes pivot relative to each other about a generally horizontal axis generally perpendicular to the conduit, and the pivotal axis is approximately in alignment with the longitudinal axis of the conduit at the joint. A bracket 40, extending from the top of one of the conduit sections to the top of the outer yoke rigidly connects the outer yoke to the one conduit section. Another bracket 42 extends from the top of the adjacent conduit section toward the top of the inner yoke. The bracket 42 is rigidly secured at one end to the conduit section and has an upwardly facing socket 44 at its other end for receiving a ball 46 secured to and depending from the top of the inner yoke.

Directly beneath the ball and socket is a flexible hose section 50 for joining the ends of the adjacent conduit sections 16. The hose section 50 is fastened to the pipe sections with suitable hose clamps 52. It will be noted that the ends of the adjacent conduit sections are in axial alignment, but are held separated. This separation in cooperation with the ball and socket and flexible hose section permits the joint to flex about horizontal and vertical axes as previously mentioned. Of course, the flexible hose section 50 also permits the flow of liquid from one pipe section to the next.

Secured to the lower ends of the outer yoke for movement therewith are parallel depending arms 54 supported at the lower ends thereof by a cross brace 56. Between the arms 54 is mounted a switch control box 58 to the cross brace 56 by means of a suitable bracket 60. A shaft 62 extends from the bottom of the control box 58 and secured at the lower end of the shaft is a horizontal lever arm 64. A vertical arm 66 depends from the lower end at one side of the inner yoke 34 for movement therewith, the lower end of the arm 66 being connected to the end of the lever arm 64. The control box 58 houses suitable switches or the like, which are part of an electrical control circuit. Thus, rotation of the shaft 62 about its vertical axis, through operation of the lever arm 64, rotates a suitable cam within the control box at the upper end of the shaft, which in turn actuates switches as will be further explained in connection with a similar control box at a steerable tower (FIG. 12).

Thus, with reference to FIG. 2, tension in the spans, indicated by tension and thus slight elongation of the flexible hose section, produces a slight separation of the adjacent conduit sections from their normal spaced relationship which will cause the top of the outer yoke to move relative to the top of the inner yoke as viewed in FIG. 2. This will cause the yokes to pivot about their axis 36 and cause the vertical arm 66, which is attached to the inner yoke to swing to the right relative to the depending arms 54, which are attached to the outer yoke. This relative displacement or pivotal movement of the yokes and arms produces a swinging movement of the lever arm 64. A switch within the control box 58 is actuated upon relative displacement of the yokes and arms beyond a preselected limit to produce corrective action as will be more fully explained.

If the adjacent conduit sections are placed in compression, as indicated by a compression of the flexible hose section 50 so that the ends of the adjacent conduit sections are brought slightly closer together, the upper end of the outer yoke will move to the left and the upper end of the inner yoke to the right as viewed in FIG. 2 causing relative pivotal movement of the yokes and a relative pivotal or swinging displacement of the arms opposite to that where the spans are under tension. This causes the lever arm to rotate the shaft 62 in the opposite direction and actuate another switch to effect corrective action as will be more fully described.

The coupling 18 provides a stable support for the conduit section, yet allows the pivotal displacement of the yokes for sensing tension and compression loads in the system.

In accordance with this invention, one or more of the support towers 20 have steerable wheels which are controlled to steer in a direction to correct a displacement sensed at a yoke type joint 18 and thus relieve the load. With reference to FIGS. 1 and 7 through 12, such a tower includes side trusses 70 extending downwardly from the conduit section 16 to opposite ends of a base beam 72. Also at opposite ends of the base beam are wheel brackets 74 to which the wheels 22 are rotatably mounted. The brackets 74 are secured at the ends of the base beam for pivotal movement about a generally vertical axis by means of a pivot pin 76 or the like. As previously explained, the wheels are driven from a drive motor 24 and through a linkage 26 and gear box 28, the linkage 26 having suitable U-joints 78.

The wheels 22 are steered from an electrical steering motor and gear drive 80 through linkages 82 pivotally connected at their outer ends to lever arms 83 which are extensions of the wheel brackets. The motor and gear drive 80 has output shafts 84 from either side thereof which are connected to threaded linkage sections 86 through U-joints 88 and linkage sections 90. The threaded sections 86 engage threaded nuts 92 held fixed within brackets 94 secured to the base member so that rotational movement of the linkage causes it to be axially displaced as the nuts are held fixed relative the base member. The linkage includes sections 98 which connect the threaded sections to the ends of lever arms 83 by a differential screw as provided by the threaded sections 86 and 86' having threads of different pitch.

The housing of the steering motor and gear drive 80 is mounted on parallel rods 106 with brackets 108 to allow sliding movement of the steering motor in a direction generally parallel to the base beam. Extending from the steering motor housing for movement therewith is an arm 110, the end of which is attached to a linkage 112 for imparting rotation to a shaft 114 extending from the bottom of a control box 116 similar to the control box 58. The control box 116 is secured to the base beam by a suitable bracket 120. Rotation of the shaft 114 rotates a cam 124 which actuates switches 126, 127 and 128, which are part of the electrical control circuit along with similar switches in the control box 58 and the steering motor 80 for controlling the steering of the wheels 22.

Upon operation of the steering motor 80 in one direction, the linkage 82 is made to move to the left as viewed in FIGS. 7 and 8, causing the wheel brackets 74 to pivot clockwise about the pivots 76 and thereby causing the wheels 22 to turn or steer in one direction. Upon operation of the steering motor 80 in the opposite direction, the linkage 82 moves to the right and the wheels are caused to turn or steer in the opposite direction. As the steering motor 80 is operated in a given direction to produce movement of the linkage 82, the steering motor slides causing the cam 124 to rotate through operation of the arm 110 and linkage 112. Upon steering of the wheel, a predetermined amount in a given direction, as indicated by sliding movement of the steering motor in a given direction, a suitable one of the switches 126 and 128 is actuated to disengage the steering motor. Thus, the switches 126 and 128 operate to disengage the steering motor. The switch 127 is a safety switch which shuts down the system in the event of malfunction.

OPERATION

To explain the operation, there is shown in FIG. 13 an illustration of an irrigation system 10 of this invention for use on rough or uneven terrain as shown by the hill h. For purposes of illustration, the system is shown with two spans with the end span on the left being a "stand alone" span. To explain the operation, it is assumed that the system is a linear type and is being guided along a path p by use of a guidance control such as that shown and described in U.S. Pat. No. 4,172,551, the entirety of which is incorporated herein by reference. The two end towers t1 and t2 of the stand alone span may be nonsteerable, self-propelled support towers, while the tower 20 is a self-propelled steerable tower as previously described. The joint 18 is a yoke type joint as previously described. First it will be assumed that the system is moving from location A to location B, during which the tower 20 moves uphill to the top of the hill h. Next it will be assumed that the system moves from location B to location C, during which the tower 20 moves downhill.

As the system moves from A to B with the tower 20 moving uphill, the conduit section on the right (as viewed in FIG. 13) will pivot upwardly (counterclockwise) relative to the conduit section on the left at the joint 18 from the position shown at location A to the position of location B. This pivoting occurs at the ball and socket of the joint 18, and thus occurs essentially about the center of the ball 46. It can be seen that this relative pivotal displacement of the adjacent spans 16 is essentially about a generally horizontal axis generally perpendicular to the conduit. This relative pivotal movement would not itself cause any appreciable pivotal displacement of the yokes 32 and 34, but instead the yokes remain generally in alignment, although both swing off the vertical as shown in FIG. 14. However, as the tower 20 moves uphill, not only does its conduit section pivot as described, but a tension load is created in the spans.

To explain why this occurs, consider that the left end tower T1 of the system follows the path p, so it can be though of as fixed. Because of the hill, the overall effective length of the system at the location B is shorter than at location A where the terrain is relatively flat. With the left end of the system fixed, the tower 20 must be moved to the left as it travels from A to B, as shown by the dashed path line d, creating a tension load in the spans as the system moves from A to B. In prior art systems, this load is considerable, as the tower traversing the hill is forced to slip sideways to effectively shorten the system. On rough terrain such load can be excessive.

Figure 15:
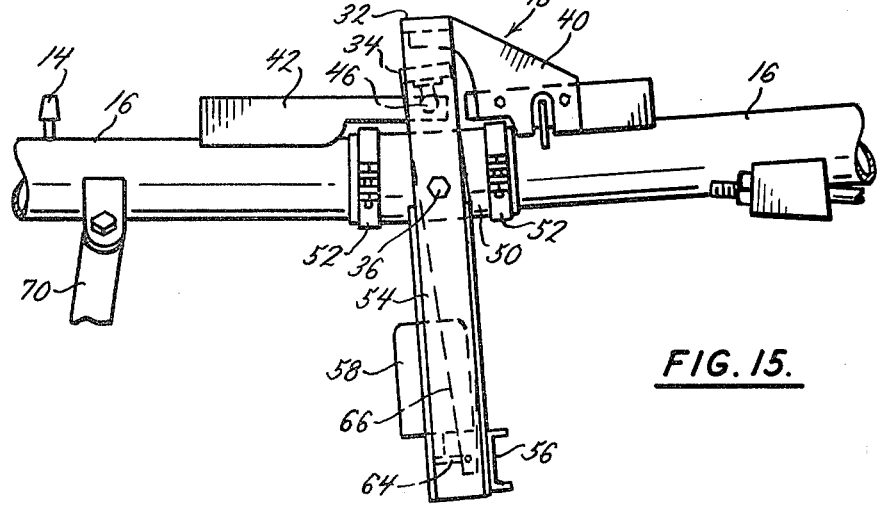

With the present invention, relatively low tension in the system causes the adjacent conduit sections to move slightly further apart. This produces relative pivotal movement of the yokes and swinging movement of the arm 66 as shown in FIG. 15. This conduit movement is permitted by the flexible hose connection 50.

It will be noted that the distance between the pivot 36 and the connection of the arm 66 to the lever 64 is substantially greater than the distance between the pivot 36 and the ball and socket. Thus, the relative displacement of the tops of the yokes under the tension load is amplified due to the length of the arm 66 so that a relatively small conduit displacement produces a greater arm displacement.

Displacement of the arm a predetermined amount actuates one of the limit switches in the control box 58 which operates the steering motor in a direction to steer the tower 20 to the left. Of course, the tower 20 is also being driven forward by the drive motor 24. When the wheels of the tower 20 have steered to the left a predetermined amount, the steering motor is disengaged by actuation of one of the limit switches in the control box 116. The wheels will remain steered to the left to relieve the tension load in the spans allowing the yokes to return to their aligned position as shown in FIG. 14. This will actuate the switch in the control box 58 to operate the steering motor in the reverse direction to straighten the wheels of the tower 20. When the wheels are straight, a switch in the control box 116 is actuated to disengage the steering motor. The tower 20 will continue uphill and this operation automatically repeats as required to relieve the tension load in the system.

Figure 16:
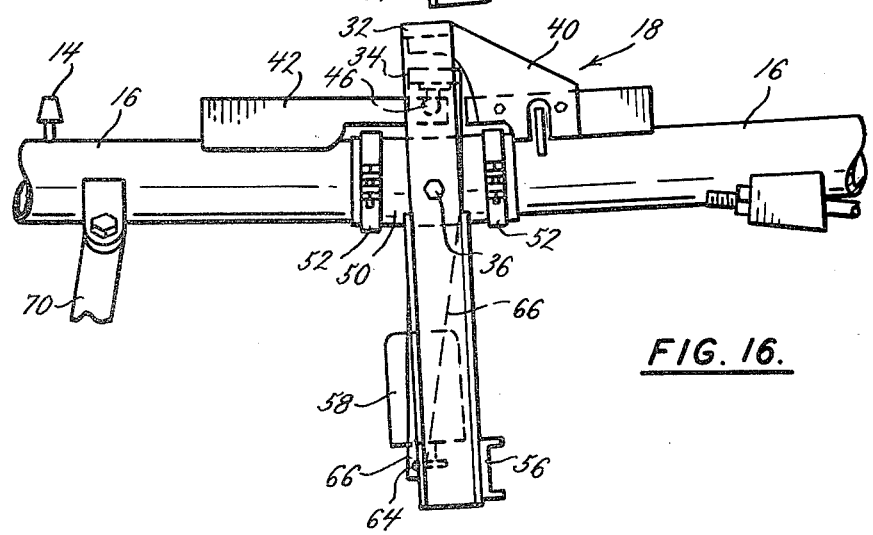

The operation of the system as it moves downhill from B to C is the reverse. As the tower 20 moves downhill, the system is put in compression. With prior systems the tower 20 will be forced to slip to the right as it traverses downhill and excessive compressive loads can result. With the present invention, a relatively small compressive load is sensed at the coupling 18 with the adjacent conduit sections moving slightly closer together. This is permitted by the flexible hose connection 50. This will cause a yoke displacement as shown in FIG. 16. When the displacement exceeds a predetermined amount, a switch within the control box 58 is actuated through swinging movement of the arm 66 and lever 64 to operate the steering motor in a direction to steer the tower 20 to the right. When the wheels have steered to a predetermined limit, a switch in the control box 116 is actuated to disengage the steering motor. The wheels remain in a full right steer position until the compressive load in the spans is relieved allowing the yokes to return to their aligned position of FIG. 14. When this occurs, a switch in the control box 58 is actuated to operate the steering motor to straighten the wheels. This is sensed by a switch in the control box 116 which disengages the steering motor so that the wheels remain straight. This operation is repeated as the system moves downhill to relieve the compressive load in the spans.

A similar analysis can be made with a tower 20 traversing a valley or draw in the field. As the tower 20 moves downhill into the draw, its conduit section 16 pivots downwardly or clockwise relative to the adjacent conduit section and the yokes of the coupling 18 also swing clockwise to a position off vertical opposite to that shown in FIG. 14. Also, as the tower moves downhill into the draw, a tension load is created in the system which is sensed by the coupling 18 causing the tower 20 to steer in a direction to relieve the load as heretofore described. As the tower 20 moves uphill from the draw, the system is placed in compression as sensed by the coupling 18 and the tower 20 is steered in a direction to relieve the compressive load as heretofore described.

Any number of yoke type sensing couplings and steerable towers may be used and may be controlled in a variety of ways depending upon the system requirements. For example, a single coupling may control one or more steerable towers. Also, any number of such couplings and towers may be used in combination with standard couplings and standard nonsteerable towers, and the placements of the sensing couplings and steerable towers in combination with standard couplings and towers may be varied depending on system requirements.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

We claim:

1. An irrigation system for irrigating a field, said system comprising a conduit for extending over the field to be irrigated, said conduit including conduit sections joined end-to-end by couplings, support towers spaced along the length of the conduit for supporting and moving the conduit over the field to be irrigated, the conduit having a series of dispensers along its length for dispensing liquid fed through the conduit onto the field, sensing means at a coupling for sensing loads within the system as caused by the system traversing sloping or uneven terrain, said sensing means having at least one pivoting member, the pivoting member having one of its ends extending substantially perpendicular to the conduit and mounted to the coupling so that parts of the member further from the conduit deflect greater distances as the member pivots, and means responsive to said sensing means sensing such a load for controlling the movement of at least one supoort tower to relieve said load, said perpendicular member end having means to operate said control means.

2. The irrigation system of claim 1 wherein said controlled support tower has steerable wheels which are steered in response to said sensing means for relieving said load.

3. The irrigation system of claim 1 wherein said sensing means further comprises a second pivoting member, means for joining an end of one conduit section to said first member, means for joining an end of the adjacent conduit section to said second member, and means connecting said first and second members allowing relative displacement of portions thereof under said load.

4. The irrigation system of claim 1 wherein said sensing means further comprises a second pivoting member, said pivoting members including yokes connected for relative pivotal displacement about an axis generally horizontal and generally perpendicular to said conduit, means connecting the ends of adjacent conduit sections to said yokes at locations spaced vertically from said axis, the end of one conduit section connected to one yoke and the end of the other conduit section connected to the other yoke, the pivotal connection of said yokes allowing relative pivotal displacement therebetween upon relative movement of said adjacent conduit sections under said load.

5. The irrigation system of claim 4 wherein the means connecting the end of at least one of said conduit sections to a yoke further comprises a ball and socket connection.

6. The irrigation system of claim 5 wherein the means connecting the end of the adjacent conduit section to the other of said yokes is a rigid connection, said ball and socket and rigid connections being above the pivotal axis of said yokes.

7. The irrigation system of claim 4 wherein said control means includes a switch means for sensing the relative pivotal displacement of said yokes.

8. An irrigation system for irrigating a field, said system comprising a conduit for extending over the field to be irrigated, said conduit including conduit sections joined end-to-end, support towers spaced along the length of the conduit for supporting and moving the conduit over the field to be irrigated, the conduit having a series of dispensers along its length for dispensing liquid fed through the conduit onto the field, and sensing means for sensing loads such as tension and compression loads within the system as caused by the system traversing sloping or uneven terrain, said sensing means further comprising a coupling between adjacent conduit sections, said coupling having first and second members, means connecting the ends of adjacent conduit sections to said members, the end of one conduit section connected to one member and the end of the other conduit section connected to the other member, and means connecting said members for pivotal movement therebetween upon relative movement of said adjacent conduit sections under said load, at least one of said members having an end extending substantially perpendicular to said pivotal connection so that parts of the member further from the conduit deflect greater distances as the member pivots, said member having means to operate a switch means for controlling the movement of at least one support tower to relieve said load.

9. The irrigation system of claim 8 wherein said controlled support tower has steerable wheels, and said system further comprises means responsive to said switch means for steering the wheels of said tower to relieve said load.

10. The irrigation system of claim 9 wherein said first and second members comprise yokes arranged to pivot in a scissoring fashion in response to load on the system.

11. The irrigation system of claim 10 wherein said first and second members are connected for pivotal movement about an axis generally horizontal and generally perpendicular to said conduit, the ends of said adjacent conduit sections being connected to said first and second members at locations spaced vertically from said axis.

12. The irrigation system of claim 11 wherein the means connecting the end of one of said conduit sections to a member is a ball and socket connection, and the means connecting the end of the adjacent conduit section to the other member is a rigid connection.

13. The irrigation system of claim 12 wherein the relative movement of adjacent conduit sections sensed by said coupling is a relative movement generally along the longitudinal axis of said conduit.

14. The irrigation system of claim 12 further comprising flexible connecting means for fluid connection of said adjacent conduit sections, said flexible connecting means being vertically aligned with said ball and socket connection.

15. The irrigation system of claim 14 wherein the pivotal connection between said coupler members is substantially aligned with the horizontal centerline of the flexible connecting means.

16. A coupling for joining conduit sections of an irrigation system for irrigating a field, said system having a conduit for extending over the field to be irrigated, said conduit including conduit sections joined end-to-end by said coupling, and said irrigation system further including support towers spaced along the length of the conduit for supporting and moving the conduit over the field to be irrigated, the conduit having a series of dispensers along its length for dispensing liquid fed through the conduit onto the field: said coupling comprising means responsive to a relative movement of said adjacent conduit sections under load for sensing said load within the system, said sensing means including a pair of pivotaly mounted yoke members, at least one of said yokes having an end extending substantially perpendicular to the conduit, and means responsive to said sensing means to initiate corrective action in the system to relieve said load, said yoke outer end having means to actuate said corrective means.

17. The coupling of claim 16 further comprising means for joining the end of one conduit section to said first yoke, and means for joining the end of the adjacent conduit section to said second yoke, the yoke outer end being disposed on the opposite side of said pivotal connection from said joining means.

18. The coupling of claim 17 wherein said yokes are connected for relative pivotal displacement about an axis generally horizontal and generally perpendicular to said conduit and said adjacent conduit sections are connected to said members at locations spaced vertically from said axis.

19. The coupling of claim 18 wherein said means joining the end of one of said conduit sections to one yoke is a ball and socket connection, and the means joining the end of the adjacent conduit section to the other yoke is a rigid connection, said ball and socket and rigid connections being above the pivotal axis of said yokes.

20. The coupling of claim 19 wherein said coupling further comprises flexible connecting means for fluid connection of said adjacent conduit sections, said flexible connecting means being vertically aligned with said ball and socket connection, whereby said coupling allows relative pivotal movement at said coupling of adjacent conduit sections about axes generally perpendicular to the conduit.

* * * * *